US008483879B2

(12) United States Patent
Gao et al.

(10) Patent No.: US 8,483,879 B2
(45) Date of Patent: Jul. 9, 2013

(54) HUMAN-ROBOT INTERACTIVE SYSTEM HAVING A HUMAN STIFFNESS ESTIMATION CONTROL ALGORITHM

(75) Inventors: Dalong Gao, Troy, MI (US); Roland J. Menassa, Macomb, MI (US); Robin Stevenson, Bloomfield, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 599 days.

(21) Appl. No.: 12/627,033

(22) Filed: Nov. 30, 2009

(65) Prior Publication Data

US 2011/0130876 A1 Jun. 2, 2011

(51) Int. Cl.
| | |
|---|---|
| G05B 15/00 | (2006.01) |
| G05B 19/10 | (2006.01) |
| G05B 19/19 | (2006.01) |
| G06F 19/00 | (2011.01) |
| B25J 19/02 | (2006.01) |
| G08B 23/00 | (2006.01) |

(52) U.S. Cl.
USPC ........... 700/258; 700/245; 700/250; 700/253; 700/257; 700/260; 700/261; 700/262; 700/263; 700/264; 318/567; 318/568.1; 318/568.11; 318/568.16; 340/576; 901/3

(58) Field of Classification Search
USPC .................. 700/245–248, 250–264; 318/567, 318/568.1, 568.11–568.23; 340/576; 901/3
See application file for complete search history.

(56) References Cited

U.S. PATENT DOCUMENTS

| | | | | |
|---|---|---|---|---|
| 4,588,348 | A | * | 5/1986 | Beni et al. ...................... 414/730 |
| 4,964,061 | A | | 10/1990 | Grodski et al. |
| 5,336,982 | A | * | 8/1994 | Backes ..................... 318/568.22 |
| 5,499,320 | A | * | 3/1996 | Backes et al. ................. 700/260 |
| 5,581,666 | A | * | 12/1996 | Anderson ..................... 700/263 |
| 5,739,811 | A | * | 4/1998 | Rosenberg et al. ........... 345/161 |
| 6,385,509 | B2 | * | 5/2002 | Das et al. ...................... 700/260 |
| 6,566,834 | B1 | * | 5/2003 | Albus et al. ................ 318/568.2 |
| 6,587,750 | B2 | * | 7/2003 | Gerbi et al. ................... 700/245 |
| 6,612,449 | B1 | * | 9/2003 | Otani et al. ................... 212/317 |
| 7,047,826 | B2 | * | 5/2006 | Peshkin ..................... 73/862.53 |
| 7,386,365 | B2 | * | 6/2008 | Nixon ........................... 700/245 |
| 2007/0052496 | A1 | | 3/2007 | Niemeyer et al. |
| 2008/0114494 | A1 | * | 5/2008 | Nixon ........................... 700/254 |
| 2008/0161937 | A1 | | 7/2008 | Sankai |

* cited by examiner

*Primary Examiner* — James Trammell
*Assistant Examiner* — Majdi Alsomiri
(74) *Attorney, Agent, or Firm* — Quinn Law Group, PLLC

(57) ABSTRACT

A robotic system includes a robot adapted for moving a payload in proportional response to an input force from an operator, sensors adapted for measuring a predetermined set of operator input values, including the input force, and a controller. The controller determines a changing stiffness value of the operator using set of operator input values, and automatically adjusts a level of control sensitivity over the robot using the stiffness value. The input values include the input force, a muscle activation level of the operator, and a position of the operator. A method of controlling the robot includes measuring the operator input values using the plurality of sensors, processing the input values using the controller to thereby calculate the stiffness value, and automatically adjusting the level of control sensitivity over the robot using the stiffness value. A specific operator may be identified, with control sensitivity being adjusted based on the identity.

20 Claims, 1 Drawing Sheet

HUMAN-ROBOT INTERACTIVE SYSTEM HAVING A HUMAN STIFFNESS ESTIMATION CONTROL ALGORITHM

TECHNICAL FIELD

The present invention relates to a system and a method for controlling a robot in a human-robot interactive system.

BACKGROUND OF THE INVENTION

In a Human-Robot Interactive (HRI) system, a human operator interfaces directly with a robotic device that, by applying a force to one or more linkages, performs or assists in the performance of a particular task. The operator may apply input in the form of an applied force and/or torque, which a controller must interpret in relation to the task that is being performed. By doing so, the robot as well as the operator form an integrated system which performs the desired tasks. As one of two parts in the system, the robot must be able to work effectively with the human. Therefore, it is a basic goal of any HRI system to accurately define a human model, typically in the form of operating principles and/or control algorithms, allowing for a more natural and effective interaction between the human operator(s) and the various integrated components of the robot.

SUMMARY OF THE INVENTION

Accordingly, an HRI system and a method for control thereof are provided herein having an optimized level of control stability. The system includes a controller having an operator-robot interface, e.g., a control panel and sensors, and a robot with which the operator interfaces, as described herein, in proportional response to an applied input force from the operator. The robot may include one or more powered elements, such as actuators in the form of motors, brakes, pulleys, cables, and/or other linkages, with the various powered elements collectively operating on a payload or other object. For example, in an assembly environment relatively cumbersome payloads such as engines or transmissions may have to be positioned by the operator within a work cell. In such an environment, an overhead assist robot may be used to help move the payload within the work cell to thereby facilitate assembly. However, other objects or payloads may also be used without departing from the intended scope of the invention.

As an operator applies an input force to a set of handle bars attached to a control panel of the operator-robot interface, or, alternatively, to the payload itself, the controller automatically determines a stiffness value associated with the operator, adjusts the control sensitivity using this value, and then controls and coordinates the functions of various powered elements of the robot, e.g., the various motors, brakes, joints, relays, lasers, etc., to thereby control the robot in proportional response to the input force. That is, unique stiffness properties of a given operator at a given time as well as of the robot influence the overall stability and performance of the HRI system. Stiffness is defined herein as the resistance of an elastic body, e.g., human operator, to a deformation by an applied force. The stiffness of the human operator can greatly influence overall system stability, and therefore the overall effectiveness of the controller.

In one embodiment, a payload is positioned by an operator via an interface panel having handle bars each equipped with force sensors. Additional sensors such as pressure mats and lasers may be positioned with respect to the operator to precisely identify and locate the operator within the work cell. The position and force measurements are recorded by the controller, and a stiffness value of the operator is calculated. Such calculations may be performed off-line and associated with a particular operator, or they may be performed in real time. Variance from a calibrated minimum and maximum stiffness value of a given operator may be measured by way of directly or indirectly detecting muscle activation levels. An automatic adjustment then occurs in the level of control sensitivity based on the calculated stiffness value in real time, thus optimizing control stability.

Particular muscles most likely to be directly involved in a given operation, such as the human forearm and/or wrist, may be isolated as target measurement areas for determining the level of muscle activation. Electrodes or other direct muscle activation level measurement devices may be used during a particular robot-assisted operation, e.g., when an operator moves a payload with the assistance of the robot, to optimize the stiffness calculation. Indirectly, a variance in muscle size or a change in gripping force of a given operator may be used to determine muscle activation levels, and from these values, a relative stiffness value. A higher level of control sensitivity may be automatically enacted when the stiffness value is determined to be low with respect to a calibrated threshold. Likewise, when the stiffness value is determined to be relatively high, a lower level of control sensitivity may be enacted.

In particular, a robotic system is provided that includes a robot having powered elements adapted for moving a payload in proportional response to an input force from a human operator. The system includes an operator-robot interface having a plurality of sensors adapted for measuring a predetermined set of operator input values, including the input force, and a controller in communication with the interface. The controller actuates the powered elements responsive to the input force, and is determines a stiffness value of the operator using the set of operator input values. Muscle activation levels are detected during performance of a task, either directly or indirectly, to determine change in stiffness from calibrated maximum or minimum values. The controller automatically adjusts a level of control sensitivity over the robot using the stiffness value, thereby optimizing control stability.

A control system for providing motion control of the robot noted above includes the operator-robot interface with the plurality of sensors, and a host machine having an algorithm adapted for determining the stiffness value of the operator using the set of operator input values. The controller automatically adjusts the level of control sensitivity over the robot using the stiffness value, thereby optimizing control stability.

A method of controlling the robot noted above includes measuring the predetermined set of operator input values, including the input force, using the plurality of sensors, processing the input values using the controller to thereby calculate the stiffness value of the operator, and then automatically adjusting a level of control sensitivity over the robot using the stiffness value. Muscle activation levels are detected as noted above, during the performance of a task, either directly or indirectly, to determine change in stiffness from calibrated maximum or minimum values.

The above features and advantages and other features and advantages of the present invention are readily apparent from the following detailed description of the best modes for carrying out the invention when taken in connection with the accompanying drawings.

DESCRIPTION OF THE PREFERRED EMBODIMENT

Figure 1:
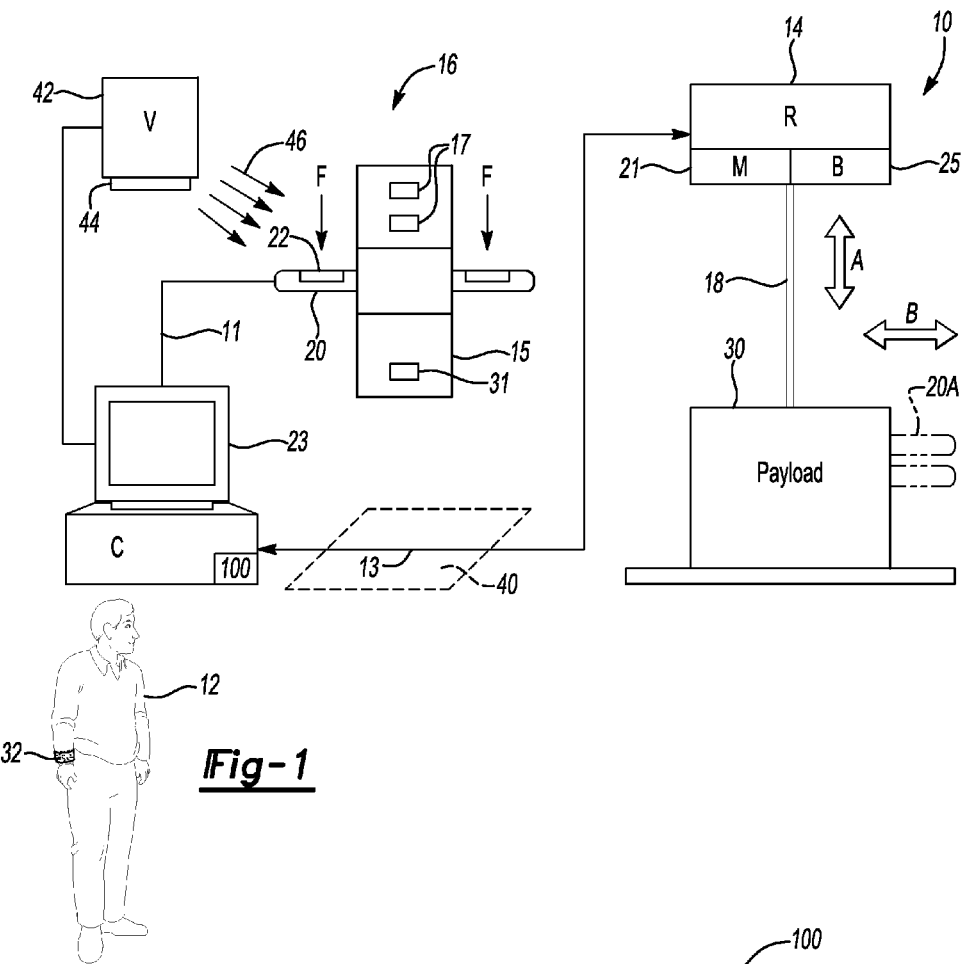
FIG. 1 is a schematic illustration of a Human-Robot Interactive (HRI) system in accordance with the invention.

With reference to the drawings, wherein like reference numbers refer to the same or similar components throughout the several views, FIG. 1 shows a Human-Robot Interactive (HRI) system 10 adapted for performing a robot-assisted operation. Within the HRI system 10, a human operator 12 interacts with a robot (R) 14 by imparting an input (arrow F), e.g., a pushing force, to an operator-robot interface 16 having a frame 15 and handle bars 20 adapted to receive the input.

In one embodiment, the robot 14 may be configured as an overhead payload assist device adapted for assisting in the positioning of a payload 30 within a work area or cell, as indicated by arrows A and B. The robot 14 may include various powered elements and/or actuators, e.g., one or more motors (M) 21 and brakes (B) 25, as well as any required relays, gears, power supplies, power conditioning equipment, etc., needed for operating the robot. Payload 30, for example an automobile engine, transmission, or other relatively cumbersome payload, may be connected to the robot 14 with as many linkage(s) 18 as are suitable for performing the desired operation. Although shown in FIG. 1 as a single linkage for simplicity, the linkage(s) 18 may be configured as a network of cables, pulleys, overhead and/or vertical support members, beams, etc., depending on the size and weight of the payload 30.

The HRI system 10 includes a control system having a controller (C) 23 embodied as a host machine 23 adapted for executing an algorithm 100, and various sensors as explained below. Execution of the algorithm 100 provides automatic human stiffness-based motion and systems-level control of the operations of robot 14, including all of the integrated components necessary for establishing precise control over the robot. The controller 23 may be configured as a single digital computer or as a distributed network of digital computers, host machines, data processing devices, or servers each having one or more microprocessors or central processing units (CPU), sufficient read only memory (ROM), random access memory (RAM), and electrically-programmable read only memory (EPROM). The controller 23 may include a high-speed clock, analog-to-digital (A/D) circuitry, digital-to-analog (D/A) circuitry, and any required input/output (I/O) circuitry, I/O devices, and communication interfaces, as well as signal conditioning and buffer electronics. Individual control algorithms resident within the controller 23 or readily accessible thereby, including the algorithm 100 as described below with reference to FIG. 2, may be stored in ROM and automatically executed at one or more different control levels to provide the respective control functionality.

Still referring to FIG. 1, operator-robot interface 16 may include, in one embodiment, the frame 15 and handle bars 20. Optionally, the handle bars 20 may be directly connected to the payload 30, as represented in phantom by optional handle bars 20A. When the frame 15 is used, the frame may be connected to one or more input devices 17, e.g., auto stop buttons, display panels, input keypads, etc., depending on the particular design. Each handle bar 20 includes a sensor 22 or an array thereof, with a force (arrow F) applied to each of the handles by operator 12 being measured via the sensors 22 and translated into an input signal 11. Input signal 11, which represents the applied force of arrow F, is relayed to the controller 23 for use by algorithm 100 as set forth below. Control data and feedback data, represented by double arrow 13, may be exchanged between the robot 14 and the controller 23 to ensure precise motion and systems control of the robot in proportional response to the applied force.

The controller 23 of FIG. 1 utilizes a human stiffness approach to determine a required level of control sensitivity. From a variable impedance control standpoint, it may be advantageous to modify control sensitivity in a manner that is readily perceptible to the operator 12. For example, from the Lyapunov theorem, as will be understood by those of ordinary skill in the art, it can be obtained that human stiffness may be used to determine boundary impedance parameters in a control system.

Given the potentially wide range of work tasks required of the robot 14 and the wide range of possible human operators each having a potentially varied level of stiffness, a constant system sensitivity level for all operators may be less than optimal. That is, different human operators may have different stiffness ranges with respect to each other. Similarly, a given operator might exhibit different levels of stiffness while performing different operations, or while performing the same operation at different times. Simply assuming a constant or conservative stiffness value, as adopted by certain conventional commercial assist robots, may render the robot difficult to effectively operate.

Still referring to FIG. 1, the algorithm 100 is automatically executed by the controller 23 to provide a stiffness-based approach to the control of robot 14. A human, such as the human operator 12 of FIG. 1, has multiple joints, e.g., wrist, fingers, elbows, etc. A proper human stiffness determination therefore considers link stiffness, i.e., a mechanical property of the human bones, and joint stiffness, i.e., a mechanical property of the various joint actuators, such as the muscles and tendons.

As will be understood by those of ordinary skill in the art, to an extent the human body may be considered a mechanical spring, which may be modeled as $$\Delta f = -k(\Delta x).$$

In this equation, $\Delta f$ represents the change in restoring force exerted by the spring in response to the applied force (arrow F), $\Delta x$ represents the distance that the spring has been stretched or compressed away from the equilibrium position, and k represents the stiffness of the spring. Human muscles likewise are in an equilibrium state before they move. Given a task, a human identifies the next equilibrium state(s), and changes undeformed length(s) of certain muscle(s) by activating the required muscles. The muscles themselves will be in a state of tension or compression before the actual change in length occurs. This state is measurable. Forces generated by the muscles ultimately move the limbs of the operator, and any payload or object assisted by the robot 14, toward a desired target.

In a human spring, the variable $\Delta x$ in the above equation may be represented as:

$$\Delta x = \Delta x_{START} - \Delta x_{END} - \Delta L$$

with $\Delta L$ being the change in length of the undeformed human spring. During an operation, e.g., when an operator moves a part using the robot 14, the value of $\Delta f$ changes as well as that of $\Delta x_{START}$, $\Delta x_{END}$, and $\Delta L$. Measurement of the length value ($\Delta L$) may be difficult to precisely determine in real time. Therefore, the controller 23 may be used to measure baseline stiffness values for a given operator 12, i.e., a minimum, equilibrium, or relaxed stiffness value when the operator is not moving and does not intend to move, as well as a maximum stiffness value. Transition within a stiffness range defined by these calibrated values may be determined by the controller 23 by measuring muscle activation levels of the operator 12 as noted below.

The theoretical formula of $\Delta f=-k(\Delta x)$ applies in a case wherein the operator 12 is not moving and does not intend to move, i.e., $\Delta x_{START}$ or $\Delta x_{END}=0$ and $\Delta L$ in an undeformed state=0. $\Delta x$ may be measured from an equilibrium state. The value of $\Delta f$ may be directly measured by the sensor(s) 22 of interface 16, with a value of the stiffness k being calculated.

In a case where operator 12 is moving, and where neither $\Delta x_{START}$ or $\Delta x_{END}$ equal to zero, the determination of these terms may be accomplished by measuring changing positions of the operator 12 and/or the payload 30 via a pressure mat 40, or measuring a relevant part of the body of operator and/or payload using a vision recognition system (V) 42, e.g., a local positioning device using suitable light sources 44 generating light beams 46, field detection mechanisms, linear variable differential transformer (LVDT)-based measurements, ultrasonic sensors 31, or other suitable local positioning devices. If the operator 12 intends to move, the length L of the undeformed human spring changes, and $\Delta L$ is not equal to zero. In these cases, the formula: $\Delta f=-k(\Delta x_{START}-\Delta x_{END}-\Delta L)$ may be used to calculate the stiffness value (k), with the value of $\Delta L$ determined by either directly or indirectly measuring muscle activation levels of the operator 12.

That is, the length (L) of the undeformed human spring, i.e., operator 12, is related to the level or degree of muscle actuation, and may be directly determined by measuring electrical properties of the muscles of the operator 12, or indirectly determined by measuring changes in muscle size of the operator as the operator performs a task. To that end, in one embodiment a bio sensor 32, e.g., a strap, may be worn by the operator 12 on a forearm or a hand to directly determine the muscle activation level, or to determine the change in muscle size, depending on the configuration of the strap. In another embodiment, sensor 22 may be adapted to measure a change in gripping force applied to the handle bars 20, or a separate sensor may be provided in that location and employed for the same purpose.

The controller 23 may use this value to optimize the calculation of the stiffness value (k). Such a strap may include electro-myographic (EMG) electrodes, force sensitive resistors (FSR), optical fibers, and/or any other suitable muscle deformation or muscle flexing sensors of the type known in the art, when direct muscle activation detection is desired. Alternately, when the operator 12 changes muscle activation levels in a forearm, for example, changes in forearm size result, which can be measured via the sensor 32 and instantly correlated to L, e.g., using a lookup table, to approximate L.

In another embodiment, an operator may grab the handle bars 20, change levels of muscle stiffness while being measured via the sensor 32, and force via the sensors 22 of interface 16, while the robot 14 introduces disturbances in different directions. Offline measurements may be recorded of the range of human stiffness for the specific operator, with these recorded values used to adjust the parameters of controller 23. Such an embodiment may help overcome difficulties in precisely measuring stiffness in real time during an actual operation by setting at least the maximum and minimum stiffness limits for a given operator, and may help optimize the control response by customizing the response for each operator. The measurement of muscle actuation using the sensors in strap 32 or sensors in 22 can be also directly correlated to the relative stiffness within the minimum and maximum values of a certain operator and therefore used by the controller 23.

Figure 2:
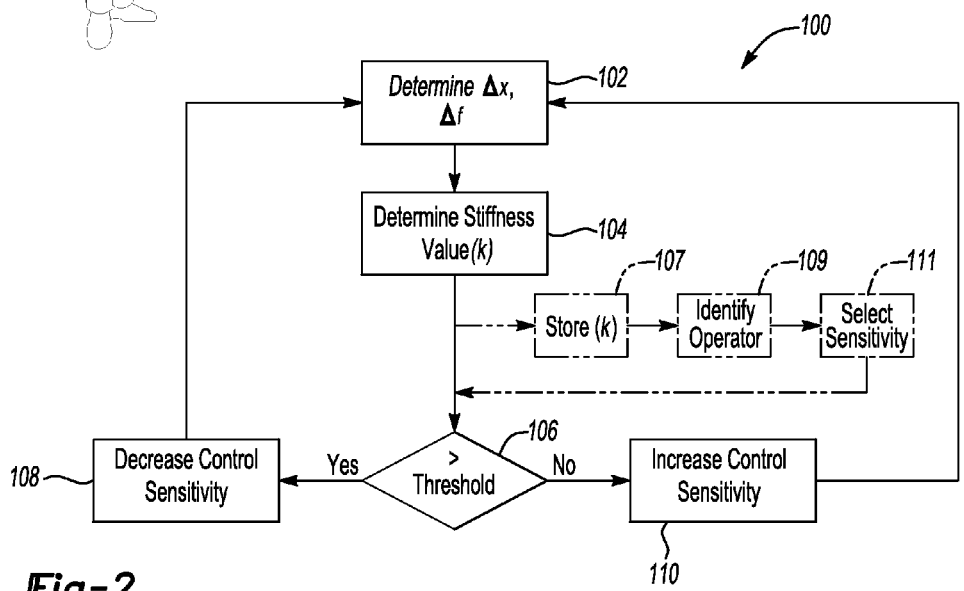
FIG. 2 is a flow chart describing a control algorithm for use with the HRI system shown in FIG. 1.

Referring to FIG. 2, algorithm 100 is adapted such that as the operator 12 moves, the body and arm position relative to the handles 20 may constantly change, as may the effective stiffness of the operator. Thus, an assessment of operator stiffness and the updating of the control algorithm 100 may be a continual, repetitive process, e.g., repeating in a control loop having a frequency sufficiently greater than the frequency a human operator can change stiffness.

Algorithm 100 begins with step 102, wherein the positional values $\Delta_{START}$ and $\Delta x_{END}$, the force value ($\Delta f$), and the length value ($\Delta L$) are determined as set forth above, and recorded in memory by the controller 23. Once determined, the algorithm 100 proceeds to step 104, wherein the controller 23 calculates the stiffness value (k) for the operator 12, for example using the equation $\Delta f=-k(\Delta x_{START}-\Delta x_{END}-\Delta L)$ as explained above, and then proceeds to step 106. Alternately, when operator correlation is desired, the algorithm 100 may proceed to optional step 107.

At step 106, the algorithm 100 may compare the stiffness value (k) to a calibrated threshold. If the stiffness value (k) exceeds the calibrated threshold, the algorithm 100 may proceed to step 108, with the algorithm otherwise proceeding to step 110.

At step 107, the algorithm 100 may store the stiffness value (k) for a given operator in memory accessible by the controller 23. Once stored, the algorithm 100 may proceed to step 109.

At step 108, the controller 23 can automatically decrease control sensitivity. That is, at step 106 it was determined that the operator 12 exhibits a greater than expected level of stiffness. The controller 23 lowers sensitivity so that the robot 14 does not resist the actions of the operator 12 to the level it might in the absence of a reduction in control sensitivity. Control stability is thus optimized. Various steps could be implemented to reduce control sensitivity, as will be understood by those of ordinary skill in the art, e.g., reducing control gains, etc. The algorithm 100 then returns to step 102. As noted above, the entire control loop may repeat in a predetermined cycle frequency, e.g., 50 Hz, 100 Hz, etc.

At step 109, the controller 23 may determine which of a plurality of known operators is using the handle bars 20, 20A, e.g., by the operator selecting or being automatically identified via a unique identification number by one of the devices 17. Once the operator's identify is known, the algorithm 100 proceeds to step 111.

At step 110, the controller can automatically increase control sensitivity. That is, at step 106 it was determined that the operator 12 exhibits a less than expected level of stiffness. The controller 23 therefore increases control sensitivity so that the robot 14 more actively responds to the actions of the operator 12. Various steps could be implemented to increase control sensitivity, as will be understood by those of ordinary skill in the art, e.g., increasing control gains, etc. The algorithm 100 then returns to step 102. As noted above, the entire control loop may repeat in a predetermined cycle frequency, e.g., 50 Hz, 100 Hz, etc.

At step 111, the controller 18 uses the operator identification of step 109 and selects, from a stored list of control sensitivities, an appropriate sensitivity for the given operator. The algorithm 100 then proceeds to step 106.

While the best modes for carrying out the invention have been described in detail, those familiar with the art to which this invention relates will recognize various alternative designs and embodiments for practicing the invention within the scope of the appended claims.

The invention claimed is:

1. A robotic system comprising:
    a robot incorporating powered elements, the robot being adapted for moving a payload using the powered elements during an operation in proportional response to an input force from a human operator;
    an operator-robot interface incorporating a pair of handle bars and a plurality of sensors which collectively measure a predetermined set of operator input values, wherein the plurality of sensors includes a pair of sensors each positioned on a respective one of the handlebars and configured to measure the input force; and
    a controller that is responsive to the input force and configured to actuate the powered elements by measuring a baseline stiffness value of the human operator as a minimum, equilibrium, or relaxed stiffness value, and calculating a change in the baseline stiffness value of the human operator during the operation using the set of operator input values;
    wherein the controller automatically adjusts a level of control sensitivity over the robot using the change in the baseline stiffness value of the human operator to thereby optimize control stability.

2. The robotic system of claim 1, wherein the plurality of sensors further includes a bio sensor that is wearable by the operator and configured to measure a muscle activation level of the operator, and wherein the predetermined set of operator input values includes the measured muscle activation level of the operator.

3. The robotic system of claim 2, wherein the plurality of sensors further includes a position sensor that measures a position of the operator, and wherein the predetermined set of operator input values further includes the measured position of the operator.

4. The robotic system of claim 2, wherein the sensor measuring the muscle activation level of the operator includes at least one of: an electrode that directly measures the muscle activation level and a sensor configured to indirectly measure the muscle activation level by at least one of measuring a change in a size of at least one muscle of the operator and measuring a grasping force of the operator.

5. The robotic system of claim 3, wherein the sensor measuring the position of the operator includes one of a light source and a pressure mat.

6. The robotic system of claim 1, wherein the controller is configured to identify a specific operator from a plurality of different operators, and to select the level of control sensitivity based on the identity of the operator.

7. The robotic system of claim 1, wherein the controller automatically increases the level of control sensitivity when the stiffness value decreases or when the stiffness value is less than a calibrated threshold value, and automatically decreases the level of control sensitivity when the stiffness value increases or when the stiffness value exceeds the calibrated threshold value.

8. The robotic system of claim 1, wherein the robot is configured as an overhead lift assistance mechanism including at least a motor and a brake.

9. A control system for providing motion control of a robot with optimized control stability, the robot having powered elements adapted for moving a payload in proportional response to an input force applied to a pair of handle bars by a human operator, the control system comprising:
    an operator-robot interface having a plurality of sensors that measure a predetermined set of operator input values, including a pair of sensors each positioned on a respective one of the handle bars and configured to measure the input force; and
    a host machine in communication with the operator-robot interface, and configured to measure a baseline stiffness value of the human operator as a minimum, equilibrium, or relaxed stiffness value, and calculate a change in the baseline stiffness value of the human operator using the set of operator input values;
    wherein the host machine actuates the powered elements in response to the input force, and automatically adjusts a level of control sensitivity over the robot using the change in the baseline stiffness value to thereby provide the optimized control stability.

10. The control system of claim 9, wherein the plurality of sensors further includes an additional sensor configured to measure, as part of the predetermined set of operator input values, at least one of: a position of the operator and a muscle activation level of the operator.

11. The control system of claim 10, wherein the additional sensor measures the position of the operator, and is one of a light source and a pressure mat.

12. The control system of claim 9, wherein the control system identifies a specific operator from a plurality of different operators, and selects the level of control sensitivity based on the identity of the operator.

13. The control system of claim 9, wherein the controller automatically increases the level of control sensitivity when the stiffness value is less than a calibrated threshold value, and decreases the level of control sensitivity when the stiffness value exceeds the calibrated threshold value.

14. A method of controlling a robot incorporating powered elements that are collectively adapted for moving a payload in proportional response to an input force from a human operator, the method comprising:
    measuring a predetermined set of operator input values using a plurality of sensors of an operator-robot interface having a pair of handle bars each having a force sensor connected thereto, including measuring the input force using the force sensors;
    measuring a baseline stiffness value of the human operator as a minimum, equilibrium, or relaxed stiffness value;
    processing the set of operator input values using a controller, including calculating a change in the baseline stiffness value of the human operator;
    controlling the powered elements in response to the measured input force; and
    automatically adjusting a level of control sensitivity over the robot as a function of the calculated change in the baseline stiffness value, thereby optimizing control stability.

15. The method of claim 14, wherein the plurality of sensors includes a strap that measures a muscle activation level of the operator, wherein measuring a predetermined set of operator input values measuring the muscle activation level via the strap.

16. The method of claim 14, wherein measuring a predetermined set of operator input values includes measuring the input force and the muscle activation level while introducing disturbances to the handle bars via the controller.

17. The method of claim 14, further comprising: identifying a specific operator from a plurality of different operators, and then selecting the level of control sensitivity based on the identity of the operator.

18. The method of claim 14, further comprising:
    comparing the stiffness value to a calibrated threshold value;

automatically increasing the level of control sensitivity when the stiffness value is less than the calibrated threshold value; and decreasing the level of control sensitivity when the stiffness value exceeds the calibrated threshold value.

19. The robotic system of claim 1, wherein the pair of handle bars is directly connected to the payload.

20. The control system of claim 9, wherein the pair of handle bars is directly connected to the payload.

\* \* \* \* \*